United States Patent [19]
Knepper

[11] Patent Number: 4,878,003
[45] Date of Patent: Oct. 31, 1989

[54] PROCESS AND INSTALLATION FOR THE AUTOMATIC CONTROL OF A UTILITY VEHICLE

[76] Inventor: Hans-Reinhard Knepper, Oberhausen, Fed. Rep. of Germany

[21] Appl. No.: 75,811
[22] PCT Filed: Oct. 14, 1986
[86] PCT No.: PCT/CH86/00143
§ 371 Date: Jun. 10, 1987
§ 102(e) Date: Jun. 10, 1987
[87] PCT Pub. No.: WO87/02483
PCT Pub. Date: Apr. 23, 1987

[30] Foreign Application Priority Data
Oct. 15, 1985 [CH] Switzerland ............ 4429/85-1

[51] Int. Cl.⁴ .................................. G05D 1/02
[52] U.S. Cl. ........................ 318/587; 318/576; 318/580; 180/168
[58] Field of Search ................ 318/567–570, 318/575, 576, 577, 580, 587; 180/168; 364/513, 424.01, 424.02, 443, 444, 447, 448, 450; 901/50

[56] References Cited
U.S. PATENT DOCUMENTS

| | | | |
|---|---|---|---|
| 3,738,443 | 6/1973 | Kubo | 318/587 X |
| 4,600,999 | 7/1986 | Ito et al. | 318/587 X |
| 4,628,454 | 12/1986 | Ito | 180/168 X |
| 4,674,048 | 6/1987 | Okumura | 318/587 X |

FOREIGN PATENT DOCUMENTS

| | | | |
|---|---|---|---|
| 0050101 | 4/1982 | European Pat. Off. | 318/587 |
| 3001718 | 7/1981 | Fed. Rep. of Germany | 318/587 |
| 52-53332 | 4/1977 | Japan | 318/587 |
| 53-4927 | 1/1978 | Japan | 318/587 |
| 54-25390 | 2/1979 | Japan | 318/587 |
| 57-187712 | 11/1982 | Japan | 318/587 |
| 57-199009 | 12/1982 | Japan | 318/587 |
| 58-107909 | 6/1983 | Japan | 318/587 |
| 59-194217 | 11/1984 | Japan | 318/587 |
| 60-91416 | 5/1985 | Japan | 318/587 |
| 60-204013 | 10/1985 | Japan | 318/587 |
| 2143969 | 2/1985 | United Kingdom | 318/587 |

Primary Examiner—Bentsu Ro
Attorney, Agent, or Firm—Louis Weinstein

[57] ABSTRACT

A method and an apparatus for automatically steering a vehicle intermittently associated with a stationary guide structure. A sensor detects the distance between the vehicle and the guide structure to provide an actual value signal, which is compared with a reference signal to effect feedback control over vehicle movement. The referenece signal is adjustably controlled periodically when required, e.g., when the vehicle has completed a circuit within the area of interest.

41 Claims, 8 Drawing Sheets $d_a < d_b < d_c .... < d_z$

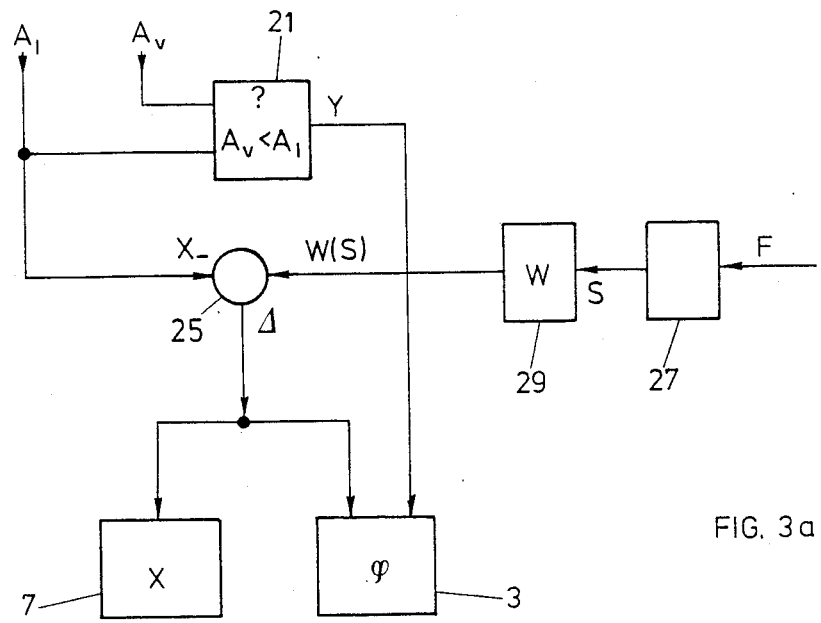
FIG. 3a
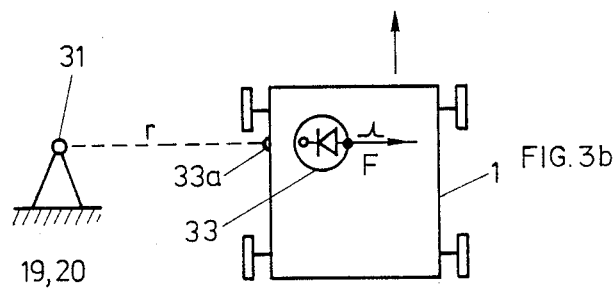
FIG. 3b
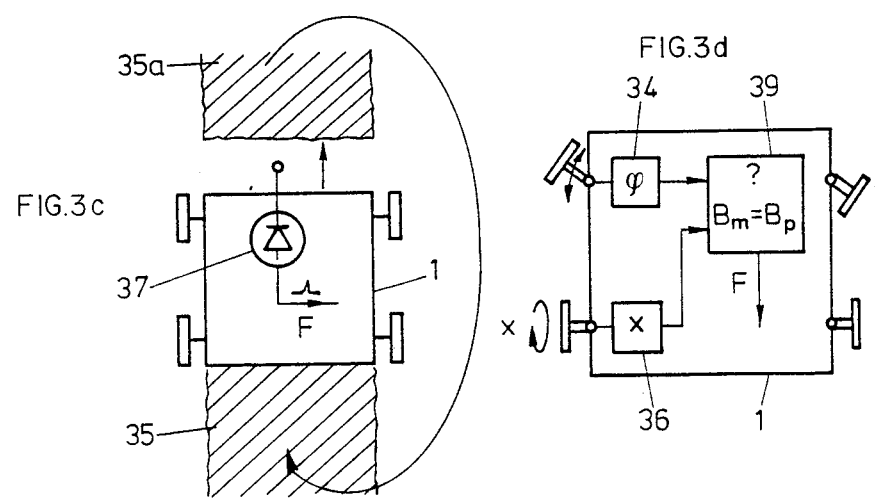

PROCESS AND INSTALLATION FOR THE AUTOMATIC CONTROL OF A UTILITY VEHICLE

FIELD OF THE INVENTION

The present invention pertains to processes for the automatic control of a utility vehicle over an area of ground, in which stationary guide structures are provided, to which the utility vehicle is effectively linked at least intermittently for guidance, and to devices for this purpose, provisions being made for at least intermittent effective linkage between the vehicle and the guide structure, and control elements being provided on the vehicle so that it can be controlled via actuation of steering and/or drive elements.

BACKGROUND OF THE INVENTION

Many different methods are known in the area of the automatic control of vehicles. In this respect, reference is made to the attached list concerning the state of the art, which forms an integral part of the present document.

A consideration of the technical development in this field shows that processes or devices which make use of stationary guide structures to control the vehicle have been known for a long time. The simplest guide structures are rails: The vehicle is connected mechanically to the rails and is guided by them. It is also known from, for example, W. German Pat. No. 2,445,001, W. German Pat. No. 2,722,222, and W. German Offenlegungsschrift No. 3,134,749, that "rails" in a general sense can be provided as permanent guide structures, and the vehicle can be effectively linked to them by optical or electrical means, such as by induction, so that it can be guided by them. W. German Offenlegungsschrift No. 3,113,086 also describes a similar method, in which reflective surfaces are provided as stationary guide structures. The position of the vehicle at any point in time is determined opto-electronically with respect to these reflective surfaces, and the vehicle is guided by means of these reflective surfaces, serving here as guide structures, to which the vehicle is optically linked.

W. German Offenlegungsschrift No. 2,704,852 describes a similar method, in which electromagnetic transmitters are used as guide structures, which are linked electromagnetically to corresponding receivers provided on the vehicle, the vehicle thus being guided by these transmitters.

All these methods based on the installation of stationary guide structures suffer from one or more of the following disadvantages:

It is extremely expensive to install a system of guide structures over an area of ground. Severe limitations are thus imposed on the flexibility with which such processes or devices can be used on unprepared ground.

If guide structures are installed permanently at relatively great distances from each other over the area, which means that the vehicle can monitor its position in the area only at relatively long time intervals, it is necessary either to accept considerable deviations between the path desired and the path actually traveled by the vehicle during the time between the vehicle checkpoints or to provide expensive measures on the vehicle which make it possible to orient the vehicle in a relative manner between the checkpoints on the basis of the recordings made of drive and/or steering element activity on the vehicle. Such relative orientation is imprecise, however, because of the unavoidable slippage between the elements mentioned and the ground and must always be verified at the checkpoints indicated.

If, for example, transmitters are provided as stationary guide structures, it is necessary to pay for installing these devices and for laying their electrical cables, but very careful planning is also needed to take advantage of the direct lines of sight available for sending and receiving.

In the effort to make the automatic control of the type indicated independent of the layout of the ground area and thus to avoid the problems involved in installing stationary guide structures and in making precise plans, high-speed electro-optic image-processing methods have been used, as is known from W. German Pat. No. 2,364,002 for example, according to which the vehicle orients itself on the basis of an "image" of the space by comparing instantaneously recorded image information with the nominal image information stored in its memory.

It is now obvious that the concept of using stationary guide structures makes accurate vehicle guidance possible only as long as the effective link between the vehicle and the guide structure is present. The longer this link remains intact or can remain intact, the simpler will be the equipment needed on the vehicle itself to guide the vehicle with some acceptable degree of precision along the intended path during the phases in which the vehicle is no longer linked with the guide structures and thus necessarily wanders off course to some extent as a result of the slippage mentioned earlier.

BRIEF DESCRIPTION OF THE INVENTION AND THE OBJECTS THEREOF

The goal of the present invention is to retain the advantages mentioned above inherent to processes and devices based on the use of stationary guide structures while eliminating their disadvantages or while making better use of such guide structures insofar as can be accomplished by maintaining the active link with the vehicle over a much longer period of time.

This goal is achieved under a first aspect of the invention in the form of a process in that the distance between th vehicle and the guide structure is under closed-loop control, whereas the nominal distance value is under open-loop control. The distance is measured from the vehicle by means of, for example, ultrasonic sensors.

The basic idea is that, if, in a closed-loop or feedback control system for controlling the distance to the guide structures, the nominal distance value can be changed in an open-loop control system, the effective link to the installed stationary guide structures can be kept intact for a much longer period of time so that the vehicle can be guided accurately on its paths across the ground area. Thus the vehicle remains linked to the guide structures insofar as its distance to these structures is controlled, even though it can be guided on completely different paths by the same guide structure through changes in the nominal distance value: Setting the distance eliminates in principle one of the degrees of freedom of vehicle movement, but the adjustment of the nominal distance value restores this degree of freedom.

Another method according to the invention for solving the problem mentioned above involves the use of the vehicle to lay a track, preferably a track on completed work. The distance of the vehicle from this track, which serves as a guide structure, is then feedback-controlled.

In a process consisting of a combination of processes according to the invention, a track, preferably a track of completed work, is laid by the vehicle, at least intermittently, and the distance of the vehicle from this track, serving as guide structure, is feedback-controlled; in addition, the distance of the vehicle from another guide structure is also feedback-controlled, at least intermittently.

Thus the distance of the vehicle from the so-called other, permanent guide structure is initially under closed-loop control until, for example, a sufficiently long track has been laid, after which this track is then used as a guide structure. So that structural contours, such as corners, can be easily followed in a distance-controlled manner, it is also proposed that the distance to the guide structures be determined in the direction of at least two fixed vehicle axes and that the distance in the one direction be used as the actual distance value for the closed-loop control, while the distance in the other direction is used as the control variable for the drive and/or steering elements on the vehicle.

If, for example, a vehicle is passing along a guide structure at a feedback-controlled distance and the guide structure has a recessed corner, this recess is registered as a sudden increase in distance in that one direction; the closed-loop control system alone is sufficient to follow this recessed corner. But if the vehicle encounters a projecting corner of the guide structure, which the vehicle follows at a controlled distance, the distance in the other direction, which suddenly decreases on approach to the projecting part of the guide structure, is registered, and this is used as the control variable or control signal for the drive or steering elements in such a way that the vehicle executes a corresponding turn, by which means the distance determination in the first direction, as an actual value determination, continues to function as input to the closed-loop control system. Thus the vehicle travels at all times under closed-loop control on one side, always keeping a guide structure, no matter what its shape, at a feedback-controlled distance.

It is also proposed that the vehicle be able to detect when it has arrived at an area over which it has already travelled. For example, this is essential when a guide structure with a closed shape is followed, as is the case, for example, with the perimeter wall around an area, so that a decision can be made as to when the nominal distance value should be changed.

For this purpose it is proposed that, from the vehicle, a path already traveled be registered by the measurement of drive and/or steering element activity, and that this information be used to establish agreement between the current position of the vehicle and a previously occupied position.

Another proposal for this purpose consists in that the detection takes the form of registering a mark at a predetermined position with respect to the vehicle.

As proposed below, the nominal distance value is then changed on the basis of the discovery that the vehicle has arrived at a part of the area over which it has already travelled.

A vehicle which now follows a closed guide structure at a controlled distance according to the invention and whose nominal distance value is changed every time it arrives at a previously travelled part of the area travels along a substantially spiral bath. It is in accordance with the second concept of the invention that the vehicle always uses the track it has just laid as a guide structure for the continuation of its travel.

When a vehicle with this type of closed-loop distance control system encounters a free-standing obstacle, which it has never before seen, additional control processes must be provided in response. However such control responses are designed, the vehicle must first recognize that the obstacle is free-standing, so that it does not simply travel around the obstacle at the prevailing nominal distance and thus possibly leave a wide, unworked strip around the obstacle. For this purpose it is proposed that a travelled vehicle path be registered and that at least part of it be stored. On the basis of these stored parts of a closed vehicle path, at least parts of a vehicle path with a modified nominal distanc value to be travelled immediately thereafter are calculated and also stored. If, thereafter, the path or parts thereof actually travelled by the vehicle deviate from the precalculated and stored parts, the conclusion is drawn that a free-standing obstacle is present in the area.

An additional case to be considered is that in which narrow passages are present, by which, for example, two wider parts of the terrain are separated. To register this, it is also proposed that a travelled vehicle path be recorded, crossovers and/or overlaps be determined, and the presence of narrow passages be inferred from that information.

It is also proposed that preselected parts of the guide structures be selected as effectively controlling guide structures and/or a chronological sequence be established according to which these parts are to become effectively controlling. By means of this measure it is possible, for example, in the case of terrain with obstacles and narrow passages, to subdivide the terrain into simply structured partial regions; to have the vehicle work over one of these regions first, for example, without regard to the others; and then to have the vehicle travel to a second partial region, which is then worked over independently of all the others, etc.

Through the preselection of which parts of the guide structures are to be effectively controlling and/or through the presetting of the chronological sequence with which they are to be registered as effectively controlling, it is also easy to guide the vehicle over any predetermined path. Presetting which guide structures become effectively controlling at which times can be accomplished easily by recording, on the vehicle, the path travelled by the vehicle and by controlling, at predetermined points along this "relative" path, which is likely to be somewhat off-course, the side of the vehicle on which the guide structure which is intended to become effectively controlling appears, possibly within a distance framework or window. The path recorded by the vehicle can suffer from error without detriment, because, after the guide structure which is to become effectively controlling has been recognized, the distance between the vehicle and the guide structure is adjusted accurately, regardless of the position in which the vehicle has recognized this structure.

Devices for automatic control of the type described above as well as preferred embodiments are specified in the claims.

BRIEF DESCRIPTION OF THE DRAWINGS

The invention is explained below by way of example on the basis of the figures:

FIG. 3a shows a closed-loop/open-loop control system on the vehicle according to FIG. 1 on the basis of a functional block diagram;

FIGS. 3b, 3c and 3d show three different variants for detecting when a vehicle according to the invention arrives at a section already travelled;

FIGS. 8b and 8c show a signal flow chart for a vehicle control system like that shown in FIG. 8a.

DETAILED DESCRIPTION OF THE INVENTION AND THE PREFERRED EMBODIMENTS THEREOF

Figure 1:
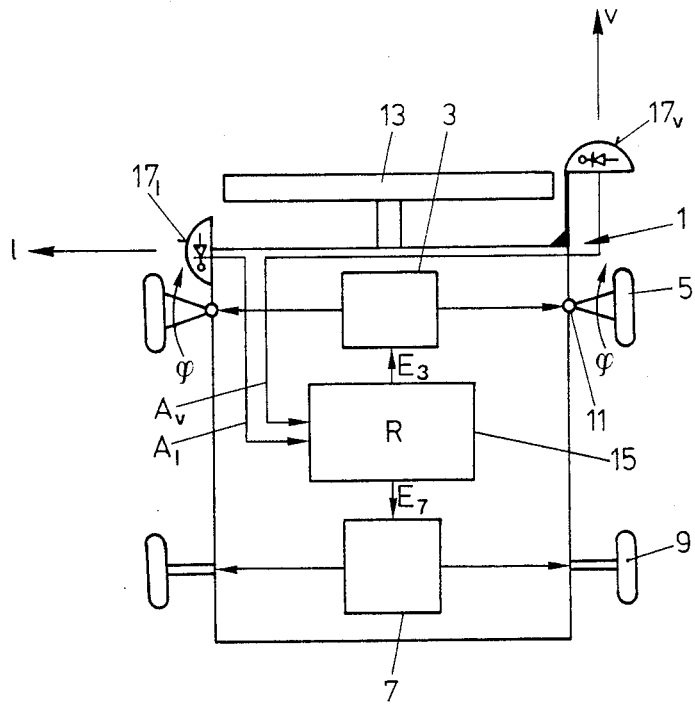
FIG. 1 shows a schematic diagram of the structure of a vehicle according to the invention.

In FIG. 1, the principal design features of a vehicle 1 are shown in purely schematic fashion. This can be a lawn mower, a floor sweeper, a vacuum cleaner, a street sweeper, a transport vehicle, etc. It is designed mechanically to suit its intended purpose. Vehicle 1 includes, as an example, front wheels 5, rear wheels 9, a controllable drive 7 for the rear wheels, which can be actuated by way of control inputs $E_7$ for forward and backward movement, both at variable speed. Front wheels 6, which are designed as steering wheels, as indicated by the symbol $\phi$, are made to pivot around joints 11 by a steering control unit 3. Drive 7 and steering control unit 3 with control inputs $E_3$ can be electric motors, for example; and steering control unit 3 can be built with linear motors, which act by way of appropriate gears on their respective wheels 5, 9. One or more tools 13 (shown schematically) can be provided on vehicle 1, such as a vacuum bar, a cleaning bar, a mower, etc., with corresponding drives (not shown) of conventional type. On the vehicle, furthermore, are distance-measuring devices, such as ultrasonic sensors, i.e., a forward-looking (V) distance sensor $17_v$ and a left-looking distance sensor $17_l$. With this sensor arrangement, the vehicle is set up for distance control toward the left. Outputs $A_v$, $A_l$ are connected to a closed-loop control device 15 provided on the vehicle, which controls steering control unit 3 or drive 7 on the basis of the signals as outputs $A_l$, $A_v$.

Figure 2:
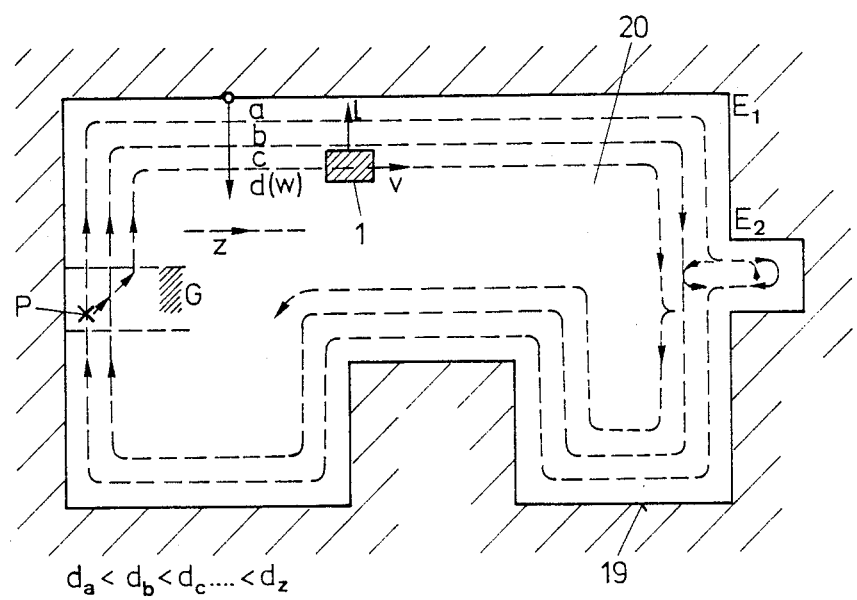
FIG. 2 shows the distance control system according to the invention for the vehicle according to FIG. 1 on an area of ground.

FIG. 2 shows an area defined by means of a boundary structure, such as walls 19, as a permanent guide structure. A spiral path travelled by a vehicle according to FIG. 1 is shown schematically proceeding from a starting point P in dotted line.

FIG. 3a shows the layout of the closed-loop control system 15 according to FIG. 1 for realization of the working path illustrated in FIG. 2.

Output signals $A_l$ and $A_v$ of distance sensors 17 are sent to a comparator 21, which determines whether the distance toward the front is smaller than the controlled distance toward the left. Signal $A_l$ of sensor $17_l$ is transmitted as the controlled variable or actual value X to a differentiator 25, to the second input of which is transmitted a distance command signal or nominal value signal W. The control difference $\Delta$ is transmitted to steering control unit 3, or possibly to drive 7, and controls the vehicle by way of these actuating units in such a way that the controlled variable X (actual value) becomes at least nearly the same as the reference input W (nominal value). Whereas signal $A_l$ acts as the controlled variable or actual value in the closed-loop system, signal $A_v$ of the forward sensor $17_v$ acts as the control signal of steering control unit 3 as soon as its value falls below the signal value of $A_l$, which is determined by unit 21, and thus turns the vehicle toward the right, in the case of a vehicle with left-oriented control. In place of a comparison between $A_v$ and $A_l$, it can be advantageous to compare the more stable value W with $A_v$. A reference input control 27 is controlled in a way to be described later by a control signal F and transmits various reference inputs or nominal value signals W to differentiator 25 by way of a reference input transmitter 29 to fulfill the function of control signal F. Reference input signal W is transmitted whenever the vehicle has completed a circuit according to FIG. 2. There are various ways in which this can be detected, as illustrated schematically in FIGS. 3b, 3c and 3d.

The first possibility consists in placing a mark at the starting point P according to FIG. 2, either on wall 19 or on the ground, especially for this purpose; or a landmark such as an edge of wall 19 or an edge of ground 20 is detected by means of a mark detector 33 on vehicle 1. Each time mark 31 is detected from vehicle 1 at a predetermined position r, a reference input control signal F is generated, by which means the reference input value W at reference input transmitter 29 is changed (increased, according to FIG. 2), and thus the feedback-controlled distance d(w) is also increased.

A second way (FIG. 3c) is to have vehicle 1 lay a track 35, even if only to serve as a mark. This can be a track of moisture if the machine is used for wet cleaning; in the case of a lawn mower, the track can be the path just mowed. Both of these tracks are easy to detect. If the working track is difficult to detect, a track especially intended for the purpose can be laid by the vehicle, such as a moisture track, which remains in existence for only a relatively short period of time and then evaporates. A track detector 37 is provided on vehicle 1, which detects when vehicle 1 encounters a previously laid track 35, designated 35a. Then a reference input change signal F is triggered, and, for example, again according to FIG. 2, a larger reference input W is sent by reference input transmitter 29.

A third variant (FIG. 3d) consists in providing pickups 34, 36 on the vehicle; these pickups record the steering deflections $\phi$ and forward movement x at the steering or drive elements. These are sent to a computing and memory unit 39, preferably including a microprocessor, which uses the directional and distance x, $\phi$ to determine continuously the travelled path B; this information is then stored. The path data $B_m$, corresponding to the monitoring of the instantaneous vehicle position, are first compared with path point $B_p$ at the start of a circuit, so that, as soon as vehicle 1, according to FIG. 2, has completed a circuit, this is detected by the agreement between the instantaneous value $B_m$ with the stored value $B_p$ at the start of the same circuit. When agreement is found, reference input change signal F is again triggered.

A vehicle 1 equipped with a control system according to FIG. 3a traverses a spiral path when placed on an area 20 according to FIG. 2. It keeps a distance $d_a$, corresponding to a reference input signal $W_a$, between it and walls 19 during its first circuit a. When the path is completed and thus a reference input change signal F is triggered, the reference input W is increased, in a generalized manner to $W_z$, and the vehicle traverses a closed path z with the assigned distance $d_z$ between it and walls 19. The vehicle also follows projecting or recessed sections of the wall. When it arrives at a corner $E_1$, comparator 21 determines that the distance from the wall to the forward sensor $17_v$ according to FIG. 1 is smaller than that from the wall to sensor $17_l$. Thus steering control unit 3 is actuated, and a right turn is executed. The distance detected by sensor $17_v$ increases again, and the distance detected with sensor $17_l$ is again transmitted as the controlled variable or actual value. In the case of a recessed corner $E_2$, sensor $17_l$ detects that the controlled distance $d_l$ assigned to it suddenly increases considerably, which leads to a corresponding control difference according to FIG. 3a. To compensate for this, the vehicle makes a left turn, by means of which the distance detected by sensor $17_l$ becomes smaller again and finally matches reference value W.

Instead of using structures inherent to the space as guide structures such as boundary walls, by which color contrasts, material contrasts, etc. are also understood, it is also possible to install guide structures such as sprayed tracks, which evaporate after a certain time. This can be done easily, because the nominal distance control system according to the invention provides the possibility of using such vehicle guidance structures to help control paths which are much longer than the extent of the guide structures themselves. FIG. 2, for example, shows the length of a path on which the vehicle easily travles with precise control, the total length of the spirals being many times longer than the required length of the guide structure, that is, the length of the boundaries.

Figure 4:
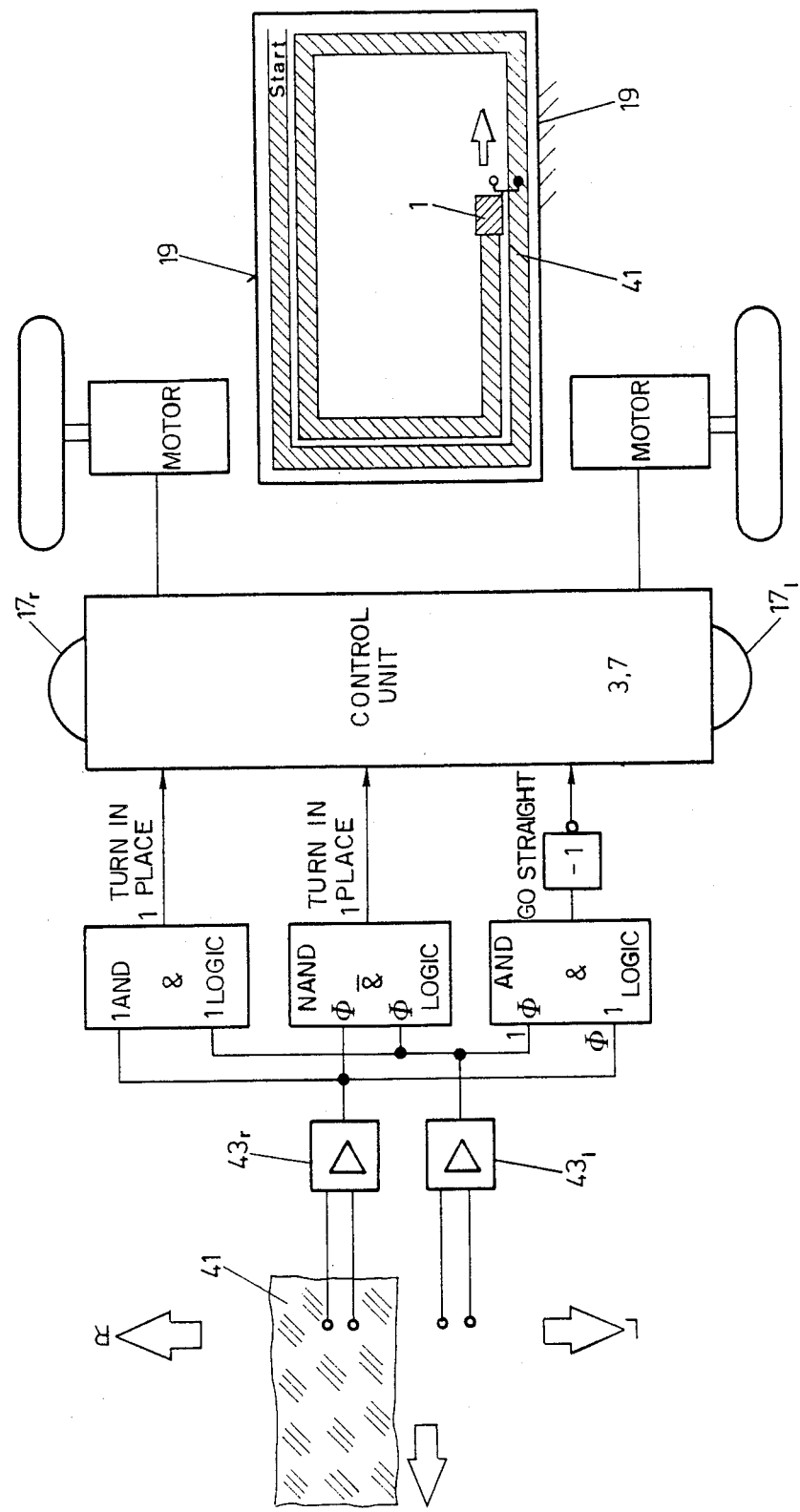
FIG. 4 shows an additional guidance variant of a vehicle according to the invention with, on the left, the path travelled by this vehicle.

FIG. 4 shows the control method according to the invention in which the guide structure is regulated by the vehicle itself. At the beginning, the vehicle, such as that already described, is guided by means of sensors 17 at a predetermined distance along walls 19 according to FIG. 1 (this can also be done manually) so that the vehicle lays a track 41. In contrast to track 35, which was described in association with FIG. 3, track 41 must be laid by vehicle 1 in at least a nearly continuous manner. In FIG. 3 it is sufficient in itself for track 35 to be laid only in the area of the starting position corresponding to P, that is, in an area G indicated as in FIG. 2 in broken line. Track 41 is preferably a track of completed work, e.g., a moisture track in the case of wet cleaning. Track sensors $43_r$, $43_l$ are provided on the front of vehicle 1, possibly together with distance sensor $17_v$. If vehicle 1 leaves behind a track of moisture, the sensors detect moisture. The two sensors 43 detect whether a track 41 is present under the vehicle or not. Once the vehicle has completed its first circuit, however it may have been configured, it encounters track 41 which it has just laid, and it is guided, as shown, by sensors 43 alongside the previously laid track 41. This retracing of the track in the design variant corresponds again to a distance control system based on structures of the space, namely, track 41, but in this case there is no nominal distance control system; the distance is predetermined, preferably in such a way that one track is laid adjacent to or even overlapping with the other.

The control system described so far is suitable, without any initial enhancements, for working on areas of ground without narrow passages and/or free-standing obstacles. On the basis of FIG. 5, the situation involving narrow passages is explained, and FIG. 6 is used to explain the problem of free-standing obstacles. Narrow passages are understood to mean passages through which the vehicle can travel at least once back and forth with distance control on one side, but in which, as the distance to the wall on one side continues to increase, the vehicle is "trapped" in a certain part of that space, as illustrated in FIG. 5.

Figure 5:
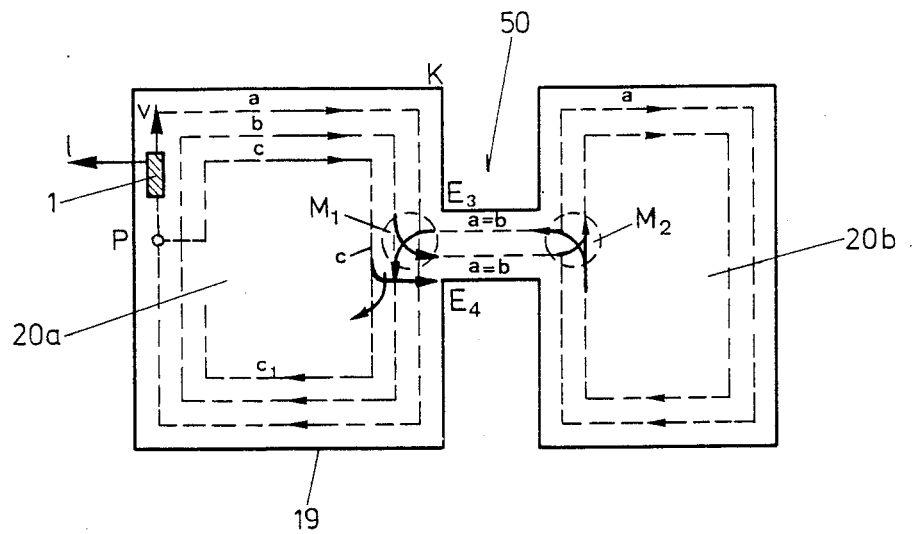
FIG. 5 shows the behavior of a vehicle according to the invention with path criteria for recognizing a narrow passage.
Figure 6:
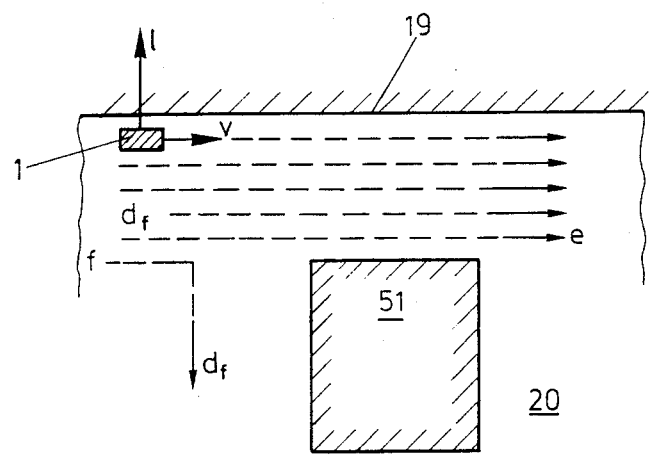
FIG. 6 shows a section of the grounds with a free-standing obstacle to illustrate the behavior of a vehicle according to the invention for determining the characteristic features of free-standing obstacles.

According to FIG. 5 which shows a space of this type with a narrowed down passage 50, the vehicle travels first along a path "a", according to a first value of the reference input W, i.e. at an accordingly constant distance from wall 19. After finishing the loop of path "a", the reference input value W is increased on the basis of signal F, which is generated as soon as the vehicle encounters a path portion it has already moved on. This occurs, according to FIG. 5, in area P where increasing of reference input value W then leads the vehicle on the path loop "b". As may be seen from FIG. 5, path loop "b" becomes already identical with a part of path loop "a" in the narrow passage 50, because the distance according to "b" seen to the left-hand wall when the vehicle travels in FIG. 5 from the left to the right in the narrow passage 50 becomes equal to the distance according to "a", seen to the right-hand side from the vehicle. When the reference input is again increased in the area P to lead the vehicle on path loop "c", the vehicle will first move to the region M1. There it will detect that the distance to the wall on the left abruptly increases at $E_3$. Thus the vehicle turns left. After having turned left, sensor $17_v$ picks up the corner $E_4$ of the narrow passage in front of it. Thus, vehicle 1 pivots again towards the right due to the control signal from unit 21 according to FIG. 3a, exactly as it would do in front of a corner, such as of K. The vehicle will now follow as indicated by path "c1" the wall 19 of the left area part 20a at the controlled distance according to path c1. This area on the left is worked on until its center is reached. The right area part 20b to the right of the narrow passage 50 in FIG. 5 is not worked on.

To solve this problem it is necessary for the vehicle to recognize such a narrow passage 50 so as to be able to control its movements so that both partial areas will be worked on. As may be seen from FIG. 5, in any narrow passage the path of the vehicle will intersect twice. Such occurrence of intersections are used as criterium as to when such a narrow passage is encountered. Thus, if it is found that the path of the vehicle intersects twice or overlaps along a part of the path, a "narrow passage encountered" criterium is found and correspondingly interventions can be made in the reference input control system 27, 29 according to FIG. 3a to lead the vehicle in part 20b too. Detection of the occurrence or number of such intersections makes it possible to identify the narrowed down structure of the area and thus to control the reference inputs accordingly.

FIG. 6 shows the occurrences in the presence of a free standing obstacle 51. A free standing obstacle is according to definition an obstacle which is positioned on the grounds 20 with respect to a guide structure, e.g. a boundary wall 19, at such a distance that vehicle 1 can travel at least once through the gap between wall 19 and obstacle 51. After this at least one passage of vehicle 1 between wall 19 and obstacle 51 and increase of the controlled distance "d", at some point the vehicle 1 will stand in front of obstacle 51, not able to pass the gap. This occurs, according to FIG. 6, for instance, at path "f". Similar to the case of encountering a corner K as shown in FIGS. 2 and 5, the vehicle will now turn right and follow the boundary of obstacle 51 at the control distance $d_f$ according to path "f". Thus, there remains an unworked, possibly wide strip around obstacle 51. Here too, there must be found a criterium defining "obtstacle encountered" on the vehicle. Such a criterium is, as clearly may be seen from FIG. 6, that whenever a free standing obstacle is encountered by vehicle 1, its instantaneous path, as "f" of FIG. 6, will deviate from a previously travelled path, as "e" of FIG. 6, i.e. path "f" will branch off the direction of path "e". As the reference input $W_f$ would, without obstacle 51, lead the vehicle in a distance according to $d_f$ in parallelism to path "e" and, with the obstacle 51 encountered, the path will branch from that direction, a simple criterium for "free standing obstacle encountered" is thus found.

Thus, there is found a criterium for "narrow passage encountered" and "free standing obstacle encountered", so that proper algorithms for the control of the reference input may be chosen as an answer to such criteriums in a control computer, in such a way that the vehicle correctly reacts to either obstacles or narrow passages. This is readily possible for the man skilled in the art.

Figure 7:
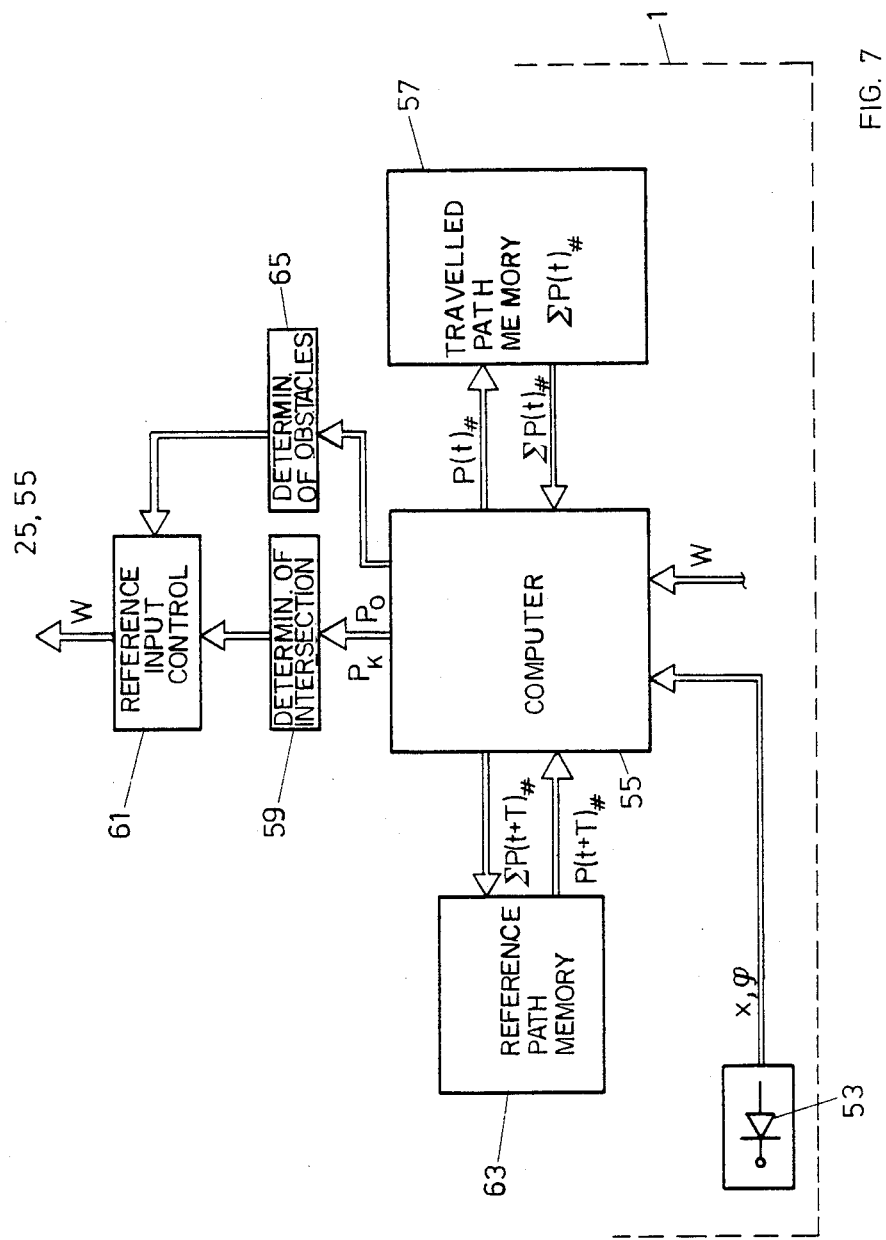
FIG. 7 is a block diagram of a closed-loop/open-loop control system for a vehicle according to the invention, making use of the criteria found for narrow passages and obstacles.

The basic structure of a control system designed for such cases is shown in FIG. 7. On vehicle 1, forward movements $\chi$ and steering deflections $\phi$ are registered by means of appropriate detectors 53. These values are sent to a computing unit 55. Computer 55 calculates from these data the instantaneous position P(t) of vehicle 1 with respect ot a stationary system of coordinates. The corresponding data P(t)$_\#$ are sent to a path memory unit 57, where the travelled path is stored with the totality $\Sigma$ of the data on the individual positions. From the totality of these position data $\Sigma$P(t)$_\#$ and the instantaneous position data P(t)$_\#$, computer 55 determines the intersections $P_k$ if the path just travelled and positions $R_0$, at which a travelled path becomes closed, as indicated schemetically by block 59. A reference input control system 61 operates according to certain rules in correspondence with the position of the intersections or closure points which have been found.

When a closed path has been completed, furthermore, the new reference value signal W to become active is sent to computer 55 as the input variable. From the path $\Sigma$P(t)$_\#$ previously travelled and stored in memory 57, and in the knowledge of the new reference input value W, the computer calculates path $\Sigma$P(t+T)$_\#$ to be followed immediately thereafter and loads its data into a reference path memory 63. While the vehicle now travels along the new path, computer 55 compares continuously the instantaneous path positions P(t)$_\#$ expressed by $\chi$ and $\Phi$ with the reference path data P(t+T)$_\#$ stored in reference path memory 63. If the two sets of data differ from each other, it is concluded that an obstacle such as that indicated by block 65 is present, and the reference input control system 61 is adjusted according to the predetermined rules.

Instead of recognizing narrow passages and obstacles, as described above, and solving control algorithms developed for such cases, the procedure described below is based on dividing complicated spaces into simple partial spaces and on moving the vehicle from one space to another as it finishes its work in the former. This can be realized by temporarily disconnecting the control system and moving the vehicle in the simplest way possible with however much error along an approximate path from the one partial area to the other. This procedure also makes it possible to steer the vehicle on any desired predetermined path on a space of ground from one point to another automatically; the vehicle will be operating predominantly in a distance-controlled manner, but it can be told when it is to use which guide structures appearing in its field of vision as effectively controlling structures.

Figure 8A:
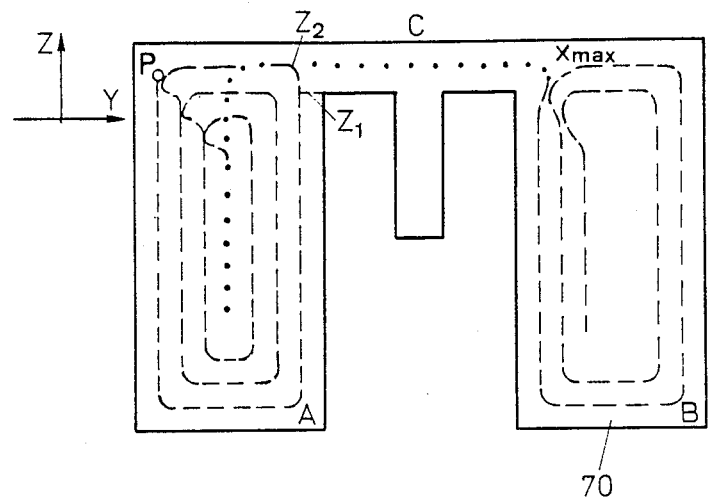
FIG. 8a shows an area having a complicated structure and a simple vehicle control system according to the invention therein.

FIG. 8a shows an area 70 with a relatively complicated structure. This area 70 can be divided, for example, into regions A and B. These partial regions A and B are connected by a narrow passage C. As can be seen from FIG. 8a, the vehicle is to be started at P, work over partial region A first, as if the other regions did not exist, as shown in broken line, and then, as shown in dotted line, perform its work in region B, as if regions A and C did not exist.

As has been shown with respect to FIG. 5, when an area to be worked has a narrow passage, the vehicle will first pass once or several times through the narrow passage and then finish working one part of the area at one side of the narrow passage. It might be desirable after working on such an area and first recognition by the intersection criterium such a narrow passage, to have the vehicle in later work operations on that area first completing left-hand area 20a without affecting right-hand area 20b and then moving through the narrow passage to start and complete work in area 20b.

Figure 8B:
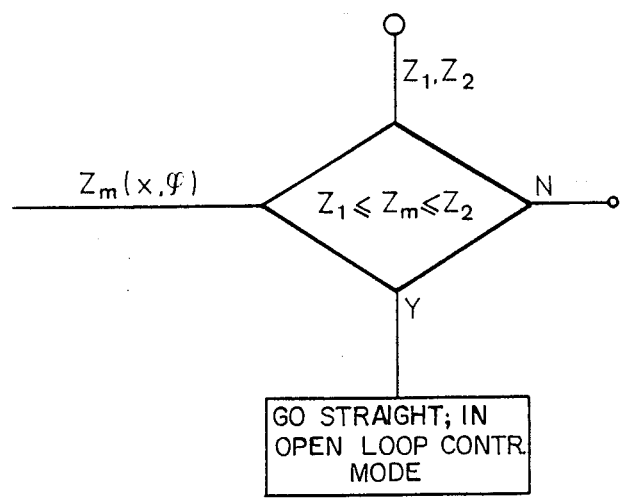

Once a narrow passage 50 has been recognized, the location of this narrow passage may be identified and stored on the vehicle, e.g., by storing two entrance points according to the Z coordinate $Z_1$ and $Z_2$ of two entrance points the narrow passage C. Normally the vehicle would, if it reaches e.g. in counter-clockwise direction any point with the Z-coordinate $Z_1$, turn right and enter the passage C. To prevent such an action, the instantaneous Z-coordinate $Z_m$ is recorded on the vehicle, e.g. by evaluation of the length and directional pickup signal (x,y) at the drive and steering elements thereof. This instantaneous coordinate $Z_m$ is compared with the value $Z_1$ of the first entrance point. When the instantaneous position of the vehicle accords with $Z_1$ according to FIG. 8b, the negative feedback control loop controlling the vehicle's distance to the right-handed wall is disabled and the vehicle gets the command to go straight ahead. Just after it has passed the point with the $Z_1$ coordinate, it encounters right ahead the upper horizontal wall according to FIG. 8a, whereupon the forward looking distance sensor as 17$_v$ controls the vehicle so as to turn left.

Figure 8C:
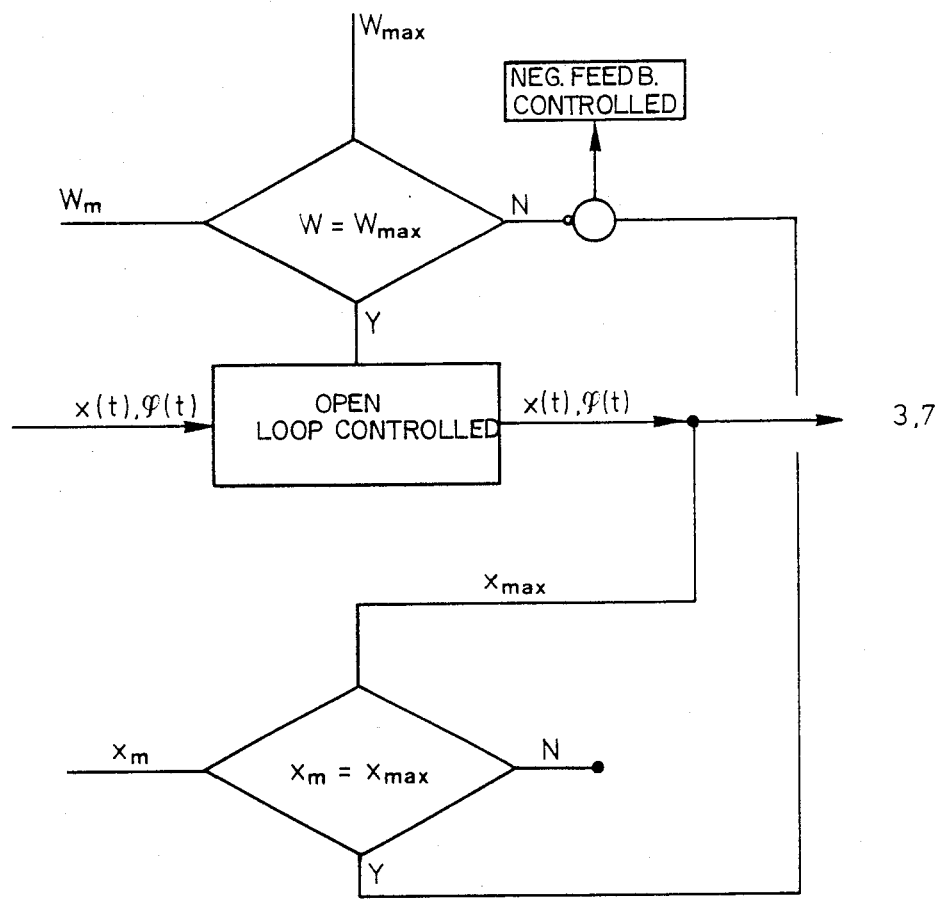

FIG. 8c shows a signal flow diagram for moving the vehicle through passage C and into partial region B after it has completed its work in partial region A. For this purpose, a maximum distance reference input value or nominal distance value $W_{max}$ corresponding to region A is compared with the instantaneously on-line distance reference value $W_m$. If agreement is found, the feedback-control system is turned off, and the vehicle is controlled according to predetermined forward and steering movements $\chi(t)$ and $\phi(t)$. Then the maximum forward movement $\chi_{max}$ thus travelled is compared with the instantaneous forward movement $\chi_m$ detected at the vehicle drive and, if agreement is found, the vehicle is again switched over to its closed-loop operating mode: it starts work again in partial region B under full feedback control.

Figure 9:
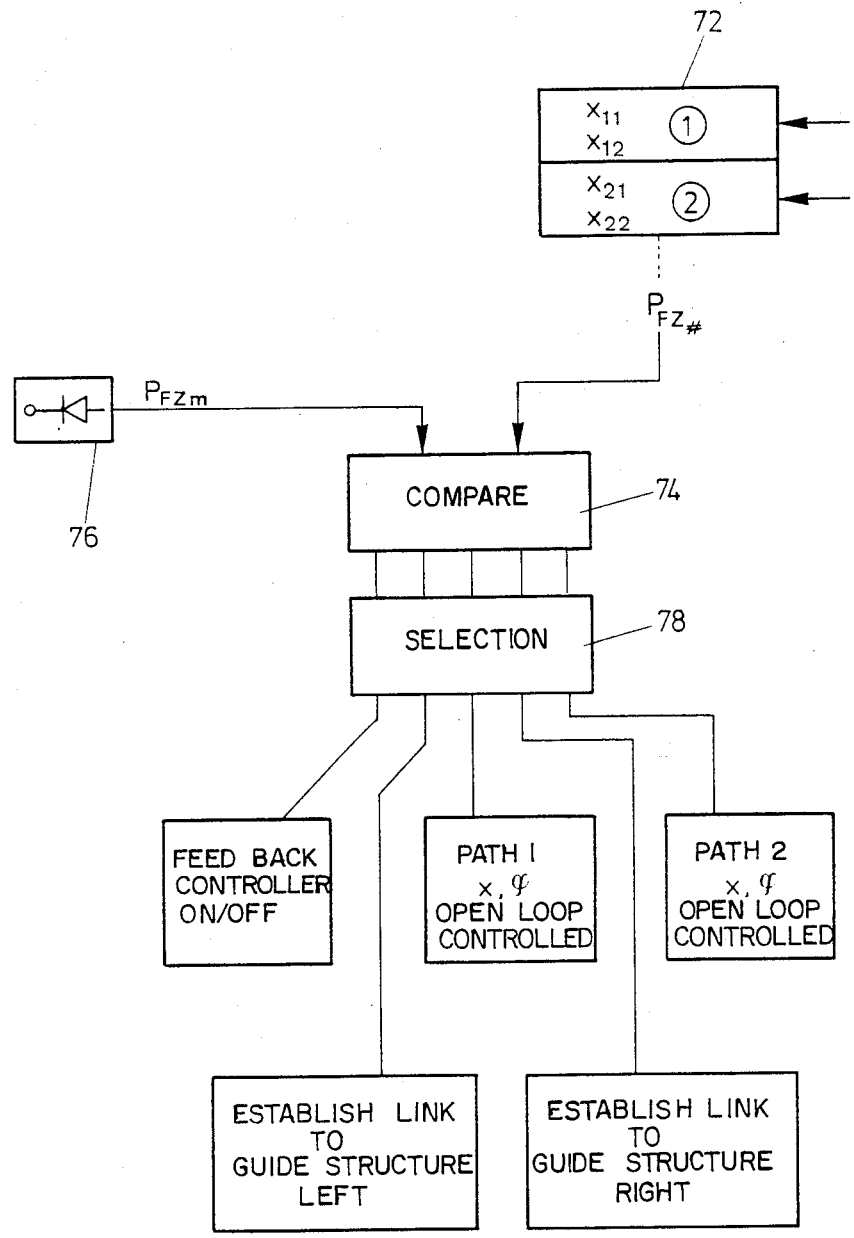
FIG. 9 is a block diagram of a control system according to the invention for the vehicle with the closed-loop control unit.

FIG. 9 shows a block diagram of a control system for executing operations such as those explained on the basis of FIG. 8a. Sets of data which specify selected positions $P_{FZ\#}$ on the area are stored in a memory unit 72. In a comparator 74, these position values are compared with instantaneous position values $P_{FZm}$, which are recorded on the vehicle by means of a detector 76, which can encompass the drive element and steering element pickups for $\chi$ and $\phi$ described previously. Depending on which preset position values $P_{FZ\#}$ the instantaneous position values $P_{FZm}$ agree with, the closed-loop controller is turned on or off by way of a selector unit 78, and a path 1 is steered without feedback by the length and steering deflection control of $\chi$ and $\Phi$, or a path 2 is taken; or, for example, a guide structure, which is now on the left of the vehicle, is detected in an effectively controlling manner. If several structures are on the left of the vehicle, the ones which are closer than 5m, for example, are detected as the effectively controlling ones, etc. In this way it is possible with little effort to guide the vehicle in any way desired over a piece of ground, making use again and again of the distance control process according to the invention for selected guide structures.

In all cases, the present invention is thus based on the principle of guiding the vehicle at a controlled distance from structures in accordance with predefined rules. It thus becomes possible to make optimum use of the information inherent in the area in question. After all, such structures define the piece of ground. In this way it is made possible, even when areas with complicated structures are to be traversed without error, to proceed from a simple basic concept and thus to solve special cases such as negotiating narrow passages and travelling around obstacles by means of relative orientation. It is obvious, of course, that a man of the art will think of many possible rules for solving the special cases mentioned.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. A method for the automatic control of a utility vehicle over an area having a stationary guide structure where the vehicle is operationally associated with said structure in at least an intermittent manner to effect guidance, characterized by including the steps of:
    said vehicle laying down a detectable track on the surface of said area to identify its path or movement;
    detecting the distance of said vehicle relative to said track; and exerting closed-loop feedback control over the vehicle and utilizing the distance data as one input to the closed-loop feedback control;
    said method being further characterized in that the distance to the guide structures is obtained by determining the distance between the guide structure and the vehicle in at least two fixed vehicle axes; utilizing the distance along one of said axes as an input to the closed loop feedback control; and utilizing the distance along the other one of said axes as a control variable for selectively driving and steering the vehicle.

2. A method for the automatic control of a utility vehicle over an area having a stationary guide structure and where the vehicle is operationally associated with said structure in at least an intermittent manner to effect vehicle guidance, characterized by comprising the steps of:
    operating the vehicle to lay down a track of at least an intermittent nature upon said area;
    utilizing the distance of the vehicle from said track to exert closed-loop feedback control upon the vehicle; and
    intermittently utilizing the distance of the vehicle from an additional guide structure to intermittently exert closed-loop guidance control upon the vehicle;
    said method being further characterized in that the distance to the additional guide structures is obtained by determining the distance between the additional guide structure and the vehicle in at least two fixed vehicles axes; utilizing the distance along one of said as an input to the closed loop guidance control;
    and utilizing the distance along the other one of said axes as a control variable for selectively driving and steering the vehicle.

3. A method for the automatic control of a utility vehicle over an area having a stationary guide structure and where the vehicle is operationally associated with said structure at least intermittently to effect guidance of the vehicle, characterized by including the steps of:
    maintaining the distance between the vehicle and the guide structure by means of closed-loop feedback control; and
    obtaining a nominal distance value for use as a command value by the closed-loop feedback control and varying said value according to detection of the guide structure;
    said method being further characterized by including detecting when the vehicle moves upon an area it has already traversed to alter its path and moving the vehicle further away from the guide structure by varying the nominal distance value whereby the vehicle traverses a substantially spiral-shaped path.

4. A method as claimed in claim 3 characterized in that a path already traveled is determined by storage of drive and steering movements of the vehicle to provide path information and in that, from said path information, agreement is established between an instantaneous position of the vehicle and a previously occupied position.

5. The method as claimed in claim 4 wherein the agreement step further includes calculating the desired position; comparing the actual position with the desired position; and producing a moving signal for moving the vehicle to establish said agreement.

6. A method as claimed in claim 3 characterized in that the distance detection between the guide structure and the vehicle is carried out by registration of a mark at a predetermined position with respect to the vehicle.

7. A method as claimed in claim 3 characterized in that upon detecting a location along the path already travelled, a nomial spacing value presently being used for shifting vehicle movement is altered.

8. A method for the atuomactic control of a utility vehicle over an area having a stationary guide structure where the vehicle is operationally associated with said structure in at least an intermittent manner to effect guidance, characterized by including the steps of:
said vehicle laying down a detectable track on the surfade of said area to identify its path of movement;
detecting the distance of said vehicle relative to said track; and exerting closed-loop feedback control over the vehicle and utilizing the distance data as one input to the closed-loop feedback control;
said method being further characterized by including detecting when the vehicle moves upon an area it has already traversed to alter its path.

9. A method for the automatic control of a utility vehicle over an area having a stationary guide structure and where the vehicle is operationally associated with said structure at least intermittently to effect guidance of the vehicle, characterized by including the steps of:
maintaining the distance between the vehicle and the guide structure by means of closed-loop feedback control; and
obtaining a nominl distance value for use as a command value by closed-loop feedback control and varying said value according to detection of the guide structure to periodically increase the distance between the vehicle and the guide structure whereby the vehicle traverses a substantially spiral-shaped path;
said method being further characterized in that the distance to the guide structure is obtained by determining the distance between the guide structure and the vehicle in at least two fixed vehicle axes; utilizing the distance along one of said axes as an input to the closed loop feedback control;
and utilizing the distance along the other one of said axes as a control variable for selectively driving and steering the vehicle;
and being still further characterized by including detecting when the vehicle moves upon an area it has already traversed to alter its path.

10. A method for the automatic control of a utility vehicle over an area having a stationary guide structure and where the vehicle is operationally associated with said structure at least intermittently to effect guidance of the vehicle, characterized by including the steps of:
maintaining the distance between the vehicle and the guide structure by means of closed-loop feedback control; and
obtaining a nominal distance value for use as a command value by the closed-loop feedback control and varying said value according to detection of the guide structure to periodically increase the distance between the vehicle and the guide structure whereby the vehicle traverses a substantially spiral-shaped path;
said method further including the step of detecting the actual path traveled by the vehicle and storing at least portions of such data utilizing previously stored portions of a closed vehicle path to calculate and store a vehicle path having an altered nominal spacing value for controlling vehicle travel and recognizing a free-standing obstacle whenever portions of the path actually travelled by the vehicle differ from the calculated portions.

11. A method for the automatic control of a utility vehicle over an area having a stationary guide structure and where the vehicle is operationally associated with said structure at least intermittently to effect guidance of the vehicle, characterized by including the steps of:
maintaining the distance between the vehicle and the guide structure by means of closed-loop feedback control; and
obtaining a nominal distance value for use as a command value by the closed-loop feedback control and varying said value according to detection of the guide structure to periodically increase the distance between the vehicle and the guide structure whereby the vehicle traverses a substantially spiral-shaped path;
said method further including the step of recording a traveled vehicle path and determining intersections and overlaps of path portions to determine the presence of narrow passages in the area being traversed by the vehicle.

12. Apparatus for the automatic control of a utility vehicle over a surface having at least one stationary guide structure along the perimeter of said surface wherein an effective link is established between the vehicle and the guide structure, said vehicle having control elements including steering and drive elements to control vehicle movement by selective actuation of said steering and drive elements in accordance with the guide structure characterized in that a closed-loop control means is provided for controlling the steering and drive elements of the vehicle, distance-measuring means for at least intermittently generating a signal representing the actual distance between the vehicle and the guide structure and controllable nominal distance means for providing a signal representing the nominal distance between the vehicle and the guide structure and feedback means responsive to said the actual distance and the nominal distance signals for operating said closed loop control means, said controllable nominal distance means periodically altering said nominal distance signal to periodically increase the distance between the vehicle and the guide structure.

13. The apparatus of claim 12 wherein said distance-measuring means includes first and second measuring means for measuring at least two fixed vehicle directions, said first measuring means including actual value signal transmitter means, and difference means for selectively controlling the steering and drive elements according to the difference between said actual distance signal and said nominal distance signal.

14. The apparatus of claim 13 wherein said second measuring means selectively controls the steering and drive elements in an open-loop fashion.

15. The apparatus of claim 13 wherein said first and second measuring means respectively comprise sensors provided for detecting the length and direction of vehicle movement and memory means for storing the sensor output signals.

16. The apparatus of claim 15 further including computer means responsive to the outputs of the sensors for calculating the instantaneous positions of the vehicle; said memory means for storing said calculated positions; comparator means for comparing instantaneous vehicle path positions with position values stored in said memory means to determine agreement between instantaneous vehicle positions and previous vehicle positions.

17. The apparatus of claim 13 further including reference path memory means for storing position data, computer means including means responsive to the position data in said reference path memory means and a nominal distance value for calculating values representing a future sequence of vehicle positions and storing said values in said reference path memory means responsive to completion of said calculations; and comparison means comparing instantaneous positions of the vehicle with positions stored in the reference path memory means to determine vehicle path deviations not previously calculated and thus unexpected.

18. The apparatus of claim 12 further including detector means for generating a mark detecting signal when a predetermined mark at a predetermined vehicle position is detected and being further characterized in that said detector means has a detector window and transmits a signal whenever said mark is aligned with said window.

19. The apparatus of claim 18 characterized in that the output of said detector means is coupled to a control input of said nominal distance means.

20. A method for automatically controlling a utility vehicle when moving over an area, said area comprising a region with a feature distinct from features of the remainder of said area, comprising the steps of:
monitoring by electrically supplied sensor means a distance between said vehicle and said distinct feature from said vehicle and at a first predetermined direction with respect to said vehicle and generating on said vehicle a first signal in dependency from said distance monitored as a controlled variable signal, thereby providing electric supply energy for said monitoring exclusively on said vehicle;
generating on said vehicle a second signal as a command variable signal;
generating a difference signal from said first and said second signals as a system deviation signal;
acting on drive means and direction control means of said vehicle with said difference signal so as to keep said difference signal minimal;
varying a distance at which said vehicle travels with respect to said feature by varying said second signal according to a desired predetermined path of said vehicle on said area.

21. The method of claim 20, further comprising the step of monitoring a second distance between said vehicle and said distinct feature at a second predetermined direction with respect to said vehicle and generating a third signal independency of said second distance at said second direction, and controlling at least one of the drive means and the direction control means of said vehicle additionally by said third signal.

22. The method of claim 21, wherein said second direction points to the front side of said vehicle.

23. The method of claim 21, further comprising the step of comparing said third signal with a reference signal and enabling said additional controlling of at least one of the drive means and the direction control means when said third signal is greater or is smaller than said reference signal.

24. The method of claim 21, further comprising the step of registering and storing on said vehicle a path of said vehicle on said area already moved, detecting when a path moved through later in time, first runs substantially parallel to a part of a path moved through earlier in time and said path moved through later in time, then branches by a predetermined amount from said substantial parallelism and generating on said detection of said branching an indication signal indicative of a free standing part of said distinct feature on said area.

25. The method according to claim 20, wherein said first direction points on one lateral side of said vehicle.

26. The method of claim 20, further comprising the steps of detecting on said vehicle a condition when said vehicle moves upon a part of said area, upon which it has already moved before, generating a detection signal when said condition is detected and controlling said direction control means of said vehicle by said detection signal.

27. The method claim 26, further comprising the steps of registering on said vehicle a path of said vehicle on said area already moved, registering on said vehicle its momentary position on said area and generating said detection signal by comparing said momentary position registered and said already moved path.

28. The method of claim 26, wherein said detection signal controls varying of said second signal.

29. The method of claim 26, wherein a predetermined mark is provided on said area, comprising the steps of detecting when said vehicle moves upon said part of said area by registering when said vehicle moves to predetermined positions with respect to said predetermined mark.

30. The method of claim 26, said distinct feature surrounding at least parts of said area, comprising the steps of increasing feedback controlled distance by said second signal and by a predetermined amount according to a broadside dimension of said vehicle whenever said detection signal is generated to lead said vehicle along said feature at a succeedingly increasing distance from said feature.

31. The method according to claim 30, further comprising the steps of registering time spans between occurrences of said generated detection signal and generating an indication signal indicative of said area comprising a narrowed down part, interconnecting two widened-up parts of said area whenever said time-spans between occurrence of two of said generated detection signals is considerably shorter than a time-span between two of said generated detection signals registered just before.

32. The method of claim 20, wherein said distinct feature comprises a track generated by said vehicle upon said area.

33. The method of claim 20, wherein said distinct feature substantially surrounds at least a predominant part of said area, comprising the step of generating a trace on said area by said vehicle along said distinct feature and varying said distance from said vehicle to said distinct feature by registering said trace on said area generated before by said vehicle and controlling said vehicle to follow said trace laterally shifted by a predetermined amount.

34. A method for automatically controlling a utility vehicle when moving over an area so that said vehicle finally has moved over at least a substantial part of said area, comprising the steps of:
guiding said vehicle first along one of a closed minimal area loop and a closed maximum area loop on said area;
causing said vehicle to lay down a detectable trace on said area;

detecting a trace previously laid down on said area by said vehicle;

controlling said vehicle automatically to follow said last-mentioned trace shifted by a predetermined distance with respect to one predetermined lateral side of said vehicle, once said trace is detected from said vehicle, so that said vehicle travels on said area along a substantially spiral-like path from said minimum area closed loop outwardly and from said maximum area closed loop inwardly.

35. A utility vehicle with an apparatus for its automatic control when moving over an area with a feature provided in a part thereof, distinct from features provided in the remaining parts thereof, comprising:

electric supply means on said vehicle for generating electrical signals;

drive means and steering means for said vehicle;

at least one sensor means for measuring a distance between said vehicle and said distinct feature, said sensor means measuring said distance at a first fixed angle with respect to said vehicle and generating a first signal, exclusively from the electric signals generated by said electric supply means;

a controllable signal generator unit generating a second signal;

a difference unit, having difference inputs of which said first and second signals are led and generating a difference output signal, said difference output signal acting on at least one of said drive means and said steering means so as to provide automatic feedback control over distance measured to be at least substantially equal to a preset distance commanded by said second signal;

a control unit for controlling the path of said vehicle with respect to said distinct feature, generating a control signal, said control signal being led to a control input of said controllable signal generator unit to vary said second signal and thus said automatic feedback controlled distance between said vehicle and said distinct feature.

36. The vehicle of claim 35, further comprising tracing means to generate a trace along at least a part of the path traversed by the vehicle as at least a part of said distinct feature.

37. The vehicle of claim 35, comprising a second sensor means monitoring a distance between said vehicle and said distinct feature and at a second fixed angle with respect to said vehicle different from said first fixed angle, said second sensor means generating a third signal whenever said distance monitored is equal to or smaller than a predetermined limit distance, said third signal acting on at least one of said drive means and said steering means.

38. The vehicle of claim 37, wherein said first fixed angle being substantially perpendicular to a forward driving direction of said vehicle and said second fixed angle being substantially zero with respect to said forward driving direction.

39. The vehicle of claim 35, wherein a distinct mark is arranged on said area, said control unit for said path comprising means registering whenever said mark appears at a predetermined fixed angle with respect to said vehicle for generating said control signal.

40. The vehicle of claim 35, said control unit further comprising registering means for registering a path of said vehicle moved on said area and generating data according to said path moved, storage means for storing said data, and comparator means to compare data previously stored within said storage means with data subsequently generated by said registering means for generating said control signal when said subsequently generated data match with data of said data previously stored.

41. A utility vehicle with an apparatus for its automatic control when moving over an area comprising:

drive means for moving said vehicle;

steering means for steering the vehicle as it moves;

trace generating means to lay down a detectable trace on said area as the vehicle moves on said area;

detecting means arranged on said vehicle and substantially shifted to one of its lateral sides for detecting a border of said last-mentioned trace, said detecting means generating a control signal for operating at least one of said drive means and a steering means so that said vehicle follows said border laterally shifted with respect to said one of its lateral sides.

* * * * *

UNITED STATES PATENT AND TRADEMARK OFFICE
CERTIFICATE OF CORRECTION

PATENT NO. : 4,878,003
DATED : October 31, 1989
INVENTOR(S) : Knepper

It is certified that error appears in the above-identified patent and that said Letters Patent is hereby corrected as shown below:

Column 3, line 67, change "bath" to --path--.

Column 5, line 44, change "6" to --5--.

Column 6, line 65, after "distance" insert --data--.

Column 9, line 44, change "ot" to --to--.

line 51, change "$R_o$" to --$P_o$--.

Signed and Sealed this

Eighth Day of October, 1991

Attest:

HARRY F. MANBECK, JR.

*Attesting Officer*  *Commissioner of Patents and Trademarks*